Oct. 28, 1952      N. E. ANDERSON      2,616,017
ELECTRODE HOLDER FOR USE IN INERT GAS-SHIELDED ARC WELDING

Filed Sept. 7, 1949

INVENTOR
NELSON E. ANDERSON
BY
ATTORNEYS

Patented Oct. 28, 1952

2,616,017

UNITED STATES PATENT OFFICE 2,616,017

ELECTRODE HOLDER FOR USE IN INERT GAS-SHIELDED ARC WELDING

Nelson E. Anderson, Berkeley Heights, N. J., assignor to Air Reduction Company, Incorporated, a corporation of New York Application September 7, 1949, Serial No. 114,396

7 Claims. (Cl. 219—14)

1

This invention relates to inert gas shielded arc welding, and more particularly to an improved electrode holder for use in that kind of arc welding.

As is well known in the arc welding art, the inert gas shielded arc welding process is one in which an arc is struck between the workpiece and an electrode to produce the necessary welding heat, and an envelope of inert gas, usually helium or argon, is maintained around the arc and the weld puddle to prevent oxidation. Sometimes a depositing electrode of either the stick or the wire type is employed and is automatically fed toward the work as it is consumed. At other times a non-consuming electrode usually made of tungsten is employed.

The inert gas is usually delivered through the electrode holder and is discharged around the tip of the electrode by a nozzle carried by the end of the holder in concentric relation with the electrode.

Since the discharge end of the nozzle is closely adjacent the arc it is desirable that the nozzle be made of some material that is highly heat resistant so as to eliminate the necessity of making some provision for water-cooling it. Also, the nozzle should preferably be highly resistant to oxidation and corrosion at the high temperatures encountered. The nozzle must be electrically insulated from the rest of the holder or be made of a material that is a non-conductor of electricity so that there will be no arcing between the discharge end of the nozzle and the work being welded. The heat changes to which the nozzle is subjected also make it desirable that it be resistant to thermal shock and it should preferably have a high degree of structural strength so that it will not be broken or cracked by the knocks and jars to which the electrode holder is subjected in normal usage.

Heretofore it has been customary to employ a nozzle made of refractory ceramic material such as silicon carbide. Such a nozzle does not meet all of the above-mentioned requirements since it is not very resistant to thermal shock or mechanical shock and is likely to crack and/or become chipped and ragged around its discharge outlet.

If the nozzle is made entirely of an oxidation and corrosion-resistant metal or alloy it will answer most of the above-mentioned requirements, but such a nozzle is expensive and, moreover, some provision must be made for electrically insulating it from the rest of the electrode holder.

The principal object of this invention is to provide an electrode holder having an improved type of gas discharge nozzle which is relatively inexpensive, is highly heat-resistant and requires no water-cooling, is highly resistant to oxidation and corrosion, has electric insulating properties of its own, has a high degree of structural strength, and is resistant to thermal shock.

According to the invention, an electrode holder is provided with a gas discharge nozzle comprising a tubular core made of relatively inexpensive metal, such as low carbon steel, having a highly refractory vitreous enamel coating over the entire metal core. The nozzle is removably held in place on the electrode holder preferably by the special attaching means hereinafter described.

A gas shielded arc welding electrode holder embodying the invention is illustrated in the accompanying drawing, in which.

Figure 1:
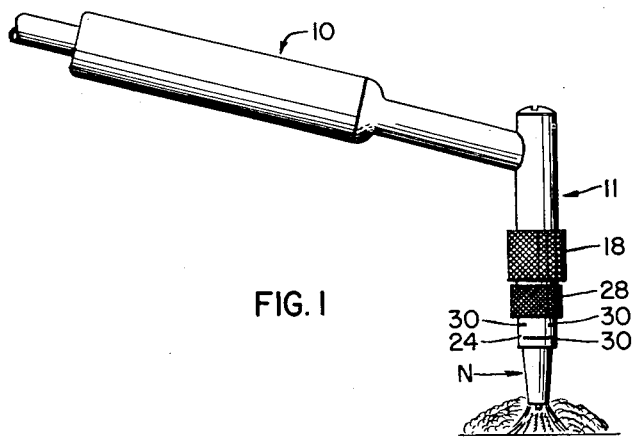
Figure 1 is a side elevation of the electrode holder.
Figure 2:
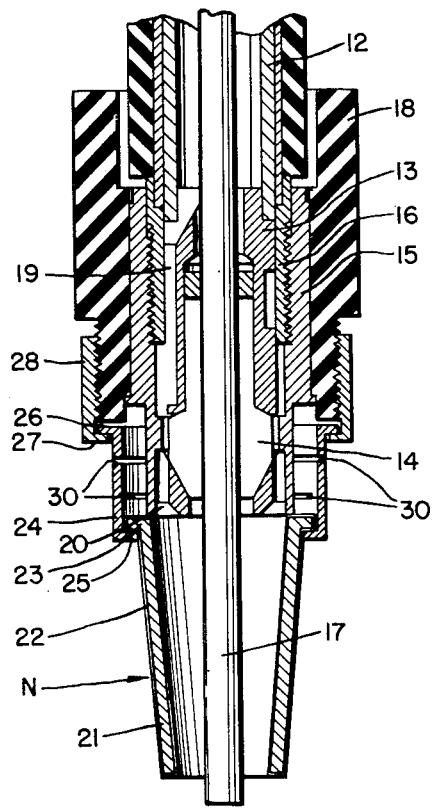
Fig. 2 is an enlarged vertical section of the nozzle end only of the electrode holder.

The particular construction of the electrode holder, other than the gas discharge nozzle and its attaching means, forms no part of the invention. The improved nozzle may be used with any gas-shielded arc welding electrode holder, but the drawing shows it as part of a manual water-cooled electrode holder of the type disclosed and claimed in my copending application Serial No. 15,520, filed March 18, 1948 now Patent No. 2,512,706 issued June 27, 1950. A complete description of the electrode holder is not necessary for an understanding of the invention, it being sufficient to note that it comprises a handle portion 10 and a barrel portion 11, and that an inert shielding gas, such as helium, delivered to the handle portion passes through it, and then through an inner metal tube 12 (Fig. 2) forming part of the barrel portion. At the lower end of the tube 12 there is a collet holder 13 which receives a collet having resilient jaws 14. A collet sleeve 15 has threaded engagement with a stationary part 16 at the lower end of the barrel portion of the electrode holder. The collet and collet sleeve constitute a chuck for gripping the electrode 17. When the electrode is inserted in the collet and the collet sleeve is turned in the proper direction by means of an insulating collar 18 surrounding the upper portion of it, the jaws of the collet are forced by the collet sleeve into gripping engagement with the electrode.

The collet holder 13 has a gas passage 19 through which the shielding gas from tube 12 flows downwardly toward the nozzle. The gas then passes through passages 20 in the lower portion of the collet sleeve into the gas nozzle N which discharges it in the form of an annular stream surrounding the tip of the electrode.

According to the invention the nozzle comprises a base or core 21 made of suitable metal having a highly refractory vitreous enamel coating 22 over its entire surface both inside and outside. By "suitable metal" is meant one that is not only capable of withstanding the temperatures to which it is subjected during the welding operations performed with the electrode holder, but is also capable of withstanding the temperatures employed in the enameling process which range from around 1500° to around 1600° F. A low-carbon steel is such a metal and is the preferred metal for the nozzle core. By "highly refractory vitreous enamel coating" is meant a glass-like protective coating that is fused to the metal core of the nozzle and that is capable of withstanding the temperatures to which the nozzle is subjected during the welding operations. Highly refractory vitreous enamel coatings for metal have already been developed and one type of such a coating that is suitable for use on the metal core of the nozzle of my electrode holder will now be described along with one method by which the coating may be applied. It should be understood, however, that the invention in its broader aspects, is not limited to a nozzle coating having the particular composition of that to be described.

While the final coating of the nozzle may be a composite one made up of several separately applied coats, it is preferably a single coating applied directly to the metal core of the nozzle. The low carbon steel core is carefully cleaned by conventional methods which preferably include degreasing, pickling, and immersion in a 3% solution of nickel-ammonium sulphate. The coating composition comprises a frit such as that used for conventional vitreous enamel coatings but containing an additional refractory material which increases the refractoriness of the coating. "Frit" is a term used in the enamel industry and refers to the material resulting from the quenching and shattering of the molten glass as it is poured into cold water from the smelting furnace. The additional refractory material may be included with the ingredients smelted in the smelting furnace to thereby make the frit itself highly refractory, but since this makes the frit difficult to handle in the smelting furnace it is preferably added to a conventional frit at the time it is ground in the ball mill for application to the metal. In the example chosen for detailed description, the additional refractory material is calcined aluminum oxide. The conventional frit to which the calcined aluminum oxide is added may be made from the following ingredients in the proportions by weight listed below:

| Ingredient: | Parts by weight |
|---|---|
| Feldspar | 31.0 |
| Flint | 18.0 |
| Borax | 37.1 |
| Soda ash | 5.9 |
| Soda nitre | 3.8 |
| Fluorspar | 3.0 |
| Cobalt oxide | 0.5 |
| Nickel oxide | .6 |
| Manganese oxide | 1.1 |

The computed chemical composition of the same frit is as follows:

| Ingredient: | Parts by weight |
|---|---|
| $SiO_2$ | 49.2 |
| $Al_2O_3$ | 7.7 |
| $B_2O_3$ | 17.4 |
| $CaO$ | 2.9 |
| $K_2O$ | 4.5 |
| $Na_2O$ | 15.2 |
| $F_2$ | .04 |
| $NiO$ | .7 |
| $CoO$ | .6 |
| $MnO_2$ | 1.4 |

100 parts by weight of the frit is added to 20 parts of the calcined alumina, 6 parts enamelers' clay, 0.25 part of black cobalt oxide, 0.05 part of citric acid crystals, and 50 parts of water, in a ball mill and the mixture is ground to a fineness that will give the desired texture. This requires grinding until approximately 1% of the weight of the frit will be retained on a No. 200 sieve. Before removing the slip (the finely ground, creamy water suspension resulting from grinding the batch in the ball mill) an additional 20 parts of water is added and thoroughly mixed. The coating composition is then applied to the metal core of the nozzle by dipping or spraying to form a coating of from 0.002" to 0.003" in thickness and the coating is fired at a temperature ranging from about 1500° to about 1600° F. for four to five minutes.

While the conventional vitreous enamel coating made from a frit prepared from the ingredients listed in the above table is refractory because of the presence of feldspar and like materials, it does not have the high degree of refractoriness which the coating of the nozzle of my electrode holder should preferably have to enable it to satisfactorily withstand the high temperatures involved in arc welding. However, the additional refractory material added to or included in the frit gives the vitreous enamel coating of the nozzle the desired high degree of refractoriness.

To facilitate attachment of the coated nozzle to the electrode holder the nozzle preferably has an outturned flange 23 at its upper end, and the means for attaching the nozzle to the electrode holder preferably comprises a retaining ring 24 having an inturned flange 25 at its lower end adapted to engage under the flange on the nozzle and having an outturned flange 26 at its upper end adapted to be engaged by an inturned flange 27 at the lower end of a nut 28 threaded on the lower end of the above-described insulating collar 18 on the collet sleeve. To clamp the nozzle to the electrode holder the nut 28 is turned to move it upwardly until the flange 25 at the lower end of the retaining ring retracts the upper end of the nozzle against the lower end 29 of the collet sleeve 13. The retaining ring 24 is made resilient by one or more pairs of opposed circumferentially extending saw cuts or slots 30, so that if the nut 28 is turned too much and causes excessive retractive force to be exerted on the nozzle the excess force will be absorbed by the slotted retaining ring without danger of chipping the enamel coating on the nozzle. Employment of the retaining ring 24 also protects the coating on the nozzle by eliminating the sliding contact which would occur if the flange on the nut 28 made direct contact with the flange on the nozzle.

The vitreous enamel coated nozzle has all of the advantages of an all-metal nozzle even when made of a relatively expensive oxidation-resistant alloy, and has all of the advantages of an all-ceramic nozzle made of silicon carbide or the like, without the disadvantages of these types of nozzles. The metal core gives the nozzle a high degree of structural strength and the vitreous enamel coating will not only withstand the high temperatures involved in arc welding but it is resistant to thermal shock. Therefore, the nozzle is not easily cracked or chipped by either mechanical or thermal shock. The coating also prevents oxidation and corrosion of the metal part of the nozzle such as would occur in the absence of the coating and thus prolongs the life of the nozzle. Moreover, the coating serves as electric insulation and prevents arcing between the discharge end of the nozzle and the work being welded. Finally, no water-cooling of the nozzle is necessary.

I claim:

1. An electrode holder for use in inert gas-shielded arc welding having means for transmitting electric current to an electrode and means for delivering a shielding gas around the tip of the electrode, said last-named means including a gas discharge nozzle comprising a tubular metal core having an interior and exterior highly refractory vitreous enamel coating.

2. An electrode holder for use in inert gas-shielded arc welding having means for transmitting electric current to an electrode and means for delivering a shielding gas around the tip of the electrode, said last-named means including a gas discharge nozzle comprising a low-carbon steel tubular core having an interior and exterior highly refractory vitreous enamel coating between .002" and .003" in thickness.

3. An electrode holder for use in inert gas-shielded arc welding having means for transmitting electric current to an electrode and means for delivering a shielding gas around the tip of the electrode, said last-named means including a gas discharge nozzle comprising a tubular metal core having an interior and exterior refractory vitreous enamel coating made from a coating composition which includes about 15% by weight of calcined aluminum oxide as one of the ingredients.

4. An electrode holder for use in inert gas-shielded arc welding having means for transmitting electric current to an electrode and means for delivering a shielding gas around the tip of the electrode, said last-named means including a gas discharge nozzle comprising a tubular metal core having a refractory vitreous enamel coating, the nozzle having an outturned flange at its upper end, a retaining ring for the nozzle having an inturned flange at its lower end engaging under said flange on the nozzle and having an outturned flange at its upper end, and a nut having threaded engagement with a part near the lower end of the electrode holder and having an inturned flange engaging under the outturned flange at the upper end of the retaining ring, turning of said nut in the proper direction serving to transmit movement to the nozzle through the retaining ring and retract the upper end of the nozzle against the lower end of the electrode holder, said retaining ring being provided with circumferentially extending slots which make it resilient.

5. An electrode holder for use in inert gas-shielded arc welding having means for transmitting electric current to an electrode and means for delivering shielding gas around the tip of the electrode, said last-named means including a gas discharge nozzle comprising a low-carbon steel tubular core having an interior and exterior highly refractory vitreous enamel coating made from a coating composition comprising a frit such as that used for conventional vitreous enamel coating to which has been added about 15% by weight of calcined aluminum oxide, said coating being between .002" and .003" in thickness.

6. An electrode holder in accordance with claim 5 in which the enamel coating consists of a single layer.

7. An electrode holder in accordance with claim 5 in which the nozzle has an outturned flange at its upper end and which includes a retaining ring for the nozzle having an inturned flange at its lower end engaging under said flange on the nozzle and having an outturned flange at its upper end, and a nut having threaded engagement with a part near the lower end of the electrode holder and having an inturned flange engaging under the outturned flange at the upper end of the retaining ring, turning of the said nut in the proper direction serving to transmit movement to the nozzle through the retaining ring and retract the upper end of the nozzle against the lower end of the electrode holder, said retaining ring being provided with circumferentially extending slots which make it resilient.

NELSON E. ANDERSON.

REFERENCES CITED

The following references are of record in the file of this patent:

UNITED STATES PATENTS

| Number | Name | Date |
| --- | --- | --- |
| 1,693,130 | Anderson | Nov. 27, 1928 |
| 1,707,433 | Hand | Apr. 2, 1929 |
| 1,881,444 | Flanzer | Oct. 11, 1932 |
| 2,247,386 | John | July 1, 1941 |
| 2,416,864 | Bricker | Mar. 4, 1947 |
| 2,470,881 | Zimbelman | May 24, 1949 |